Sept. 10, 1946.   F. H. CLAUSER ET AL   2,407,401
LATERAL CONTROL ARRANGEMENT
Filed Sept. 8, 1941   7 Sheets-Sheet 2

FRANCIS H. CLAUSER AND
CARLOS C. WOOD
INVENTORS

BY J. Edwin Coates
ATTORNEY

Patented Sept. 10, 1946

2,407,401

UNITED STATES PATENT OFFICE 2,407,401

LATERAL CONTROL ARRANGEMENT

Francis H. Clauser, Santa Monica, and Carlos C. Wood, West Los Angeles, Calif., assignors to Douglas Aircraft Company, Inc., Santa Monica, Calif.

Application September 8, 1941, Serial No. 410,098

22 Claims. (Cl. 244—42)

Our invention relates to the lateral control of aircraft and particularly to the control of high speed aircraft of the type necessitating full span flaps. With the ever increasing maximum speed of modern airplanes and higher wing loadings the stalling speeds and landing speeds have necessarily increased accordingly. This is undesirable for the reason that increase in landing speeds increases danger, particularly in view of the fact that runway lengths of landing fields generally have not been increased proportionately with the increased landing speeds.

Some time ago flaps, or air brakes as they are sometimes called, were added to aircraft along the trailing edge portions of the wings not occupied by ailerons in order to selectively change the lift and drag characteristics of the wings, lower the stalling speed and increase the gliding angle at which the aircraft could approach the landing field. This was satisfactory for a time but as aircraft speeds continually increased it became necessary to increase the flap area and it was infeasible to do this by further extension along the trailing edge for the reason that the ailerons, provided for lateral control, necessarily took up a certain portion of the wing span at the trailing edge.

To overcome this problem, experiments were made with lift spoilers which were placed ahead of the ailerons and adapted to lie flush with the top surface of the wing under normal flight conditions. The ailerons were then arranged to move downward in the manner of a flap to cooperate with the conventional flaps in increasing the lift and drag of the wing. As the airplane approached the landing field or slowed down toward stalling speed the conventional ailerons were lowered to increase the wing lift and lateral control of the craft was taken over by the spoilers, these members being raised, one at a time, from their respective flush positions in the wing.

This development was definitely a step in the right direction. However, it soon became apparent that under certain flight conditions spoilers have numerous disadvantages. For one thing, they tend to cause a control lag at the most critical time, that is; at low speeds when positive and immediate control is most needed. Furthermore, spoilers cause a yaw in the craft at a time when it is not desired, such as when the pilot is merely leveling up the airplane without turning. The discontinuity between a spoiler when raised and the aileron when the latter is being used as a flap causes a separation of the airflow over the aileron, thus creating undesirable drag and lessening desirable lift. The above disadvantages are heightened by the necessity of having the spoiler move upward from its flush position through a relatively large angle in order to obtain sufficient lateral control in a full span flap condition where the aileron at the trailing edge is immovable in level flight.

The fact that spoilers move only upward tends to prevent their use for raising a wing. In other words, when a pilot wants to level his airplane he may do so only by dropping the high wing. This is particularly serious at landing when it may be necessary to raise the low wing to avoid contact with the ground. Tests have conclusively shown that the full lifting power of a flap cannot be obtained without controlling the flow of air thereover and, as above stated, such control cannot be obtained from an ordinary spoiler because in order for the spoiler to be truly effective it is necessary that it rise a considerable amount from its normal flush position in the wing, and in its raised position it necessarily disturbs the flow over the flap.

In addition to the above enumerated spoiler disadvantages as affecting flight characteristics of an airplane, the spoilers have certain undesirable characteristics from the pilot's standpoint. For one thing, they have a tendency to give unsatisfactory stick forces for the reason that when the pilot begins to move one spoiler, the lift created thereon causes it to rise abruptly and pull the pilot's control stick over sharply. Furthermore, there is a tendency to either over-control or under-control the airplane when flying with spoilers, since there is no load feel which is proportionate to the amount of control as in ordinary ailerons.

Under the present invention an arrangement has been worked out whereby the advantages of full span flaps are obtained with the least sacrifice of normal control characteristics and with none of the disadvantages of spoilers.

Accordingly, it is the principal object of our invention to provide a full span flap arrangement for aircraft which gives satisfactory lateral control characteristics under all flight conditions.

Another object of the invention is to provide a full span flap arrangement by which an airplane may be levelled without introducing undesirable adverse yaw.

Another object of our invention is to provide a full span flap arrangement in which there is no appreciable control lag.

Another object is to provide a full span flap arrangement in which full lateral control can be obtained with only a relatively small movement of the lateral control member.

Another object is to provide a full span flap arrangement in which the flow of air over the flap is controlled to obtain maximum lift increases.

Another object is to provide a full span flap arrangement in which there are satisfactory lateral control stick forces.

Another object is to provide a full span flap arrangement with low hinge moment characteristics.

Another object is to provide a full span flap arrangement furnishing substantially normal load feel to the pilot under all flight conditions.

Another object is to provide a full span flap arrangement in which the gap between the wing and the flap opens and closes in accordance with the desired control movements and effects.

Another object is to provide a full span flap mechanism which selectively varies the movements of the control airfoils in accordance with flight conditions.

Another object is to provide a full span flap mechanism which is compact and of relatively light weight, and which provides suitable and adequate lateral control.

Other and further objects will become apparent after reading the specification and studying the drawings in which.

Figure 1:
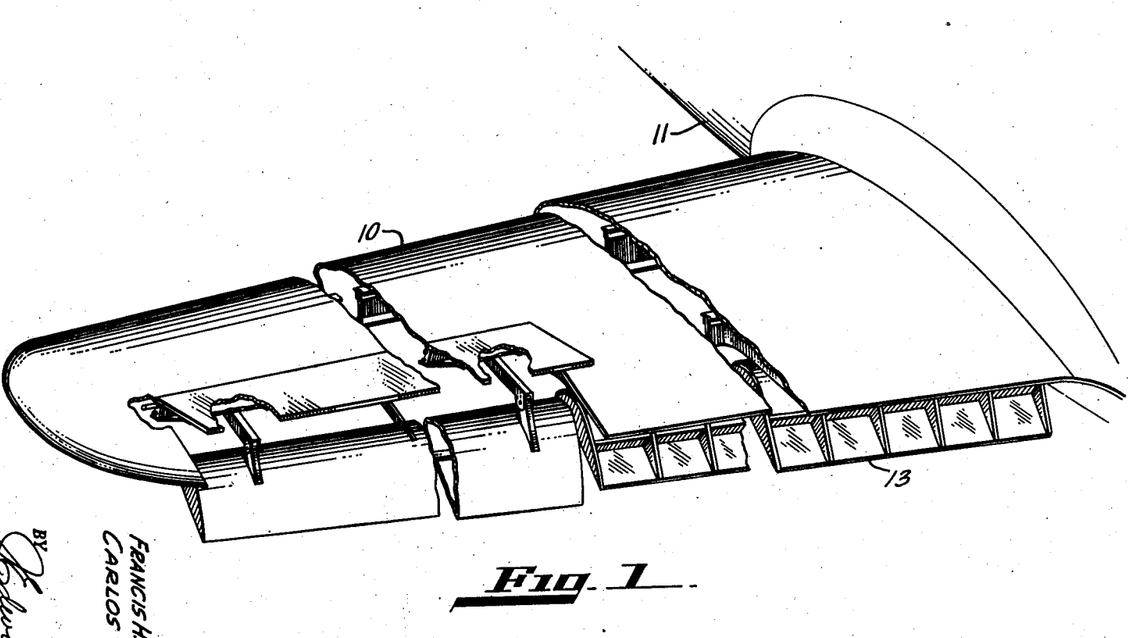
Figure 1 is a perspective view of an airplane wing with a conventional split trailing edge flap at the inboard end thereof and the control airfoil arrangement of our invention at the outboard end thereof.

With reference to the drawings, and particularly Figure 1, an airplane wing 10 is shown as being attached to a fuselage indicated in part by the lines 11. The wing carries a conventional flap 13 of the split trailing edge type on the inboard portion and a control airfoil arrangement on the outboard portion. For clarity, both the conventional flap and the control airfoils of the present invention are shown in a lift increasing position with respect to the wing 10.

Figure 2:
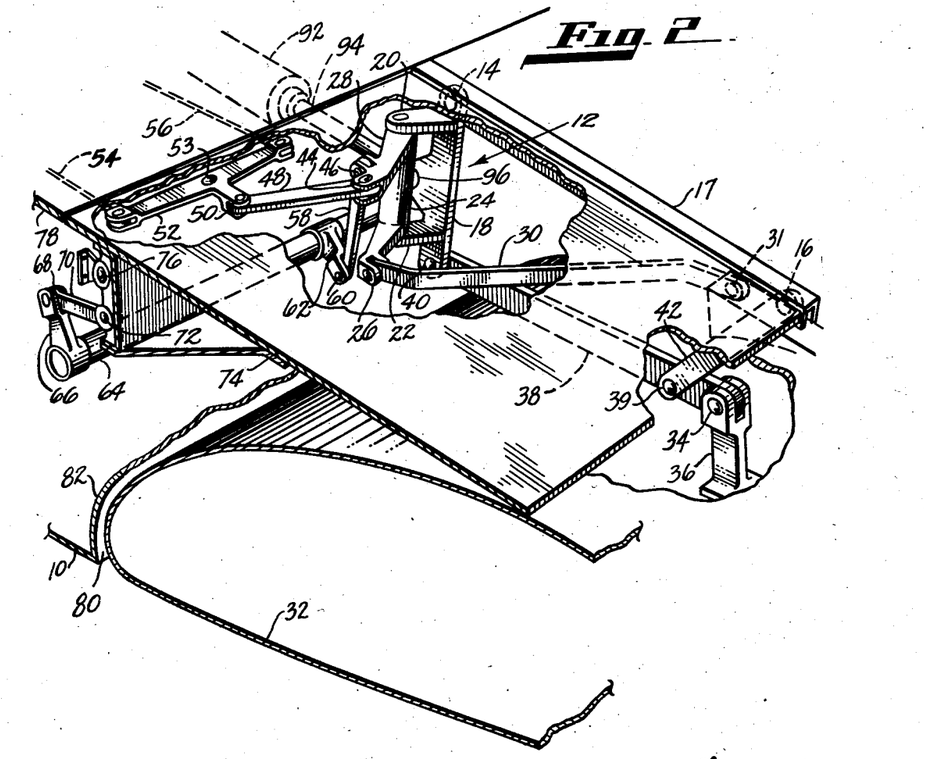
Figure 2 is a fragmentary perspective view of the wing and control airfoils of Figure 1, with portions thereof cut away to show one embodiment of a control mechanism for moving the control airfoils.

Figure 2 is a close-up view of the control airfoil arrangement and is cut away to show a mechanism assembly 12 for controlling the airfoils.

This assembly 12 is pivoted at 14 and 16 to a beam 17 forming a part of the wing structure and serves two purposes, namely; to support a pair of control airfoils and to move these control airfoils with respect to the main supporting airfoil to effect lateral control of the airplane to which they are attached. The mechanism assembly 12 includes a carrier member 18 which is connected to the main airfoil structure at the pivot 14. This carrier member has a pair of laterally protruding arms 20 and 22 between which is journaled a crank 24. The crank in turn has a pair of similarly protruding arms 26 and 28. The arm 26 is connected by a link 30 at 31 to one of the control members 32. This member 32 functions as an ordinary aileron under all normal flight conditions but, in addition, it may be moved rearward and downward from the position shown in Figure 2 in the manner of a flap under flight conditions requiring increased lift on the main supporting airfoil 10. Because of the dual functioning of the member 32 we have termed the member an "ailerflap" and it will be so referred to hereinafter.

The ailerflap is indirectly carried by the main supporting airfoil for pivotal movement with respect thereto through the mechanism assembly 12. It is directly connected to the mechanism assembly at two points; first, at the pivot 31 previously mentioned and second, at a pivot 34 through a bracket 36, fixed to the ailerflap structure. A link 38 extends from the pivot 34 forward to a pivotal connection 40 at the lower extremity of the carrier member 18. A short distance forward of the pivot 34 a link 42 is pivoted to the link 38 at 39 and extends upward to connect with the main airfoil structure beam 17 at the pivot 16.

The upper arm 28 of the crank 24 is provided with two adjacent pivotal connections 44 and 46 at its outer extremity. From the pivot 44 a short link 48 extends to a pivotal connection 50 with the center arm of a conventional three-armed bell crank 52 which is in turn pivoted to the main airfoil structure at 53. The other two arms of this bell crank provide attachment for cables 54 and 56 which extend to the pilot's compartment and connect to a control member therein by movement of which the crank 24 and parts attached thereto may be actuated.

The other pivotal connection 46 on the end of crank arm 28 serves as an attachment for a downwardly extending link 58. The lower end of this link is pivoted at 60 to an extension 62 fixed to a jack shaft 64 which is carried by the main airfoil structure and is capable of rotational movement. Fixed to the jack shaft 64 and spaced therealong are a plurality of additional extensions 66. These arms (only one of which is shown) extend upward from the jack shaft and are each pivoted at 68 to a link 70. The other end of the link 70 is pivoted at 72 to another control airfoil 74. This airfoil is pivoted at 76 to the main airfoil and is adapted when in its neutral position to form a continuation of the upper surface 78 of the main airfoil 10.

It may be seen that there is a small gap or slot 80 between the leading edge of the ailerflap 32 and the trailing edge of the main supporting airfoil 10 as defined by an upwardly curved portion 82 thereof. It also may be seen that the trailing edge of the control airfoil 74 fits closely with the top of the ailerflap 32 and thus serves to close the exit of the slot 80. For that reason we have termed the control airfoil 74 a "slot lip" and it will be so referred to hereinafter.

Figure 3:
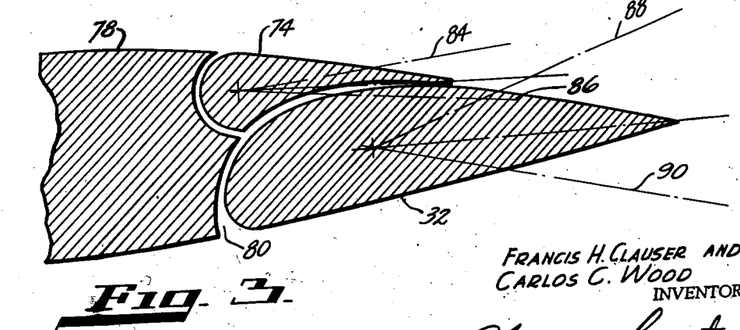
Figure 3 is a diagrammatic side elevational view of the trailing portion of the airplane wing with control airfoils mounted thereon in neutral high speed or cruising speed position, with broken lines indicating the approximate extent of their differential rotation about their mounting pivots from their respective neutral positions.

When the airplane is in normal level flight at either cruising speed or high speed the ailerflap and slot lip lie in neutral positions as shown in Figure 3. To accomplish roll control under this flight condition the pilot, by means of his control stick or wheel in the cockpit, pulls upon one or the other of the cables 54 and 56 which act rotates the bell crank 52 about its mounting pivot 53 and, through the link 48, causes the crank 24 to turn in one direction or another about its journaled connection to the carrier member 18, depending upon which of the cables is pulled. Rotation of the crank 24 on its axis causes movement of the links 30 and 58 attached thereto. As the link 30 moves it rotates the ailerflap about its pivot 34 through a differential range on either side of its neutral position as shown in Figure 3. At the same time, movement of the link 58 rotates the jackshaft 64 on its axis which in turn moves the link 70 attached to the slot lip 74 and causes movement of the slot lip in the same manner and direction as the ailerflap is moved but in a lesser degree. These relative movements are indicated by broken lines 84, 86 and 88, 90 in Figure 3.

Figure 4:
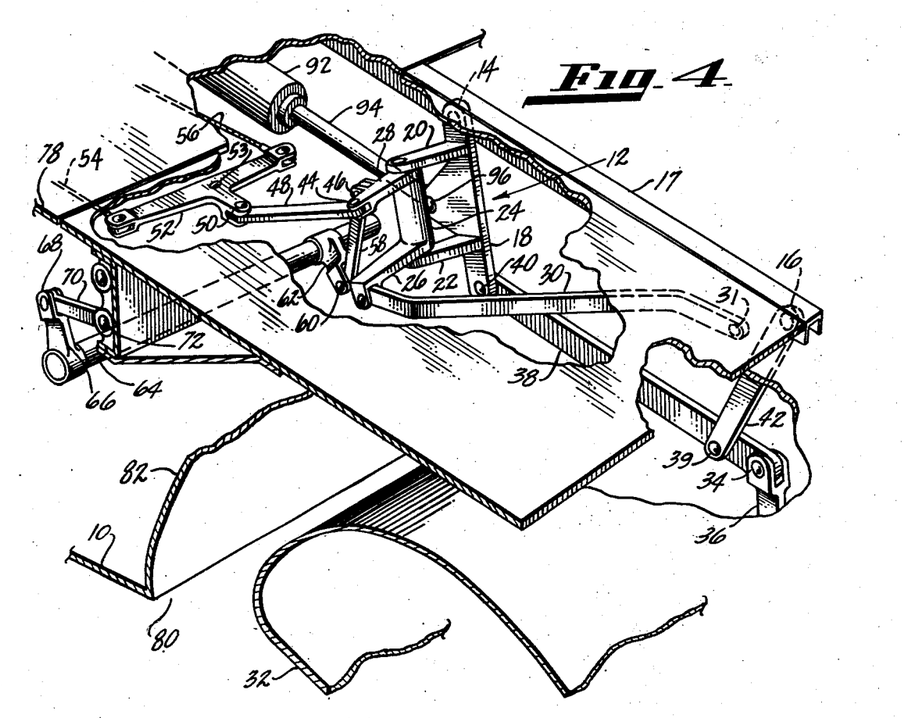
Figure 4 is a fragmentary perspective view of the airplane wing and control airfoils shown in Figure 1, with portions cut away to show the mechanism of Figure 2 and with one of the control airfoils moved to a lift increasing takeoff or approach position.

Referring now to Figure 4, the mechanism assembly 12, as depicted by Figure 2, is again shown but in a position displaced from the Figure 2 showing. This new position corresponds to that in which the ailerflap has been moved to take up flap duties. In other words, the ailerflap has been moved to the rear and downward about its pivot 39 relative to the main supporting airfoil to increase the lift thereof and is in what may be termed a "takeoff" or "approach" position.

The displacement of the mechanism assembly and the ailerflap attached thereto is accomplished by a separate operating means shown as a hydraulic cylinder 92 in the present embodiment. Although it is not shown, the closed end of the hydraulic cylinder is pivoted to the structure of the main supporting airfoil and a piston 94 thereof is pivotally connected at 96 to the carrier member 18. Operation of the hydraulic cylinder is controlled by the pilot and when the piston is extended it rotates the carrier member 18 through an arc in a counterclockwise direction about its pivotal connection 14 to the main airfoil. This rotation to the extent shown in Figure 4 causes the entire mechanism assembly to assume the position as shown in the figure.

From this increased lift position the ailerflap and slot lip may still be freely rotated about their respective pivots by pulling on one or the other of the cables 54 and 56. However, because of a change in the relative positions of the various links, the movements of the ailerflap and slot lip as effected by the cables 54 and 56 are changed over that shown in Figure 3. The new position of the ailerflap is shown in solid lines and the new relative movements of both the slot lip and ailerflap as effected by movement of the cables are shown by broken lines 98, 100 and 102, 104 in Figure 5. With the ailerflap in its camber-increasing, takeoff position the slot between the leading edge of the ailerflap and the trailing edge of the main supporting airfoil is of greater magnitude, permitting a smooth flow of air through the slot and over the ailerflap. It has been found that this smooth flow of air over the control airfoil increases its lifting effect as a flap. The present invention takes advantage of that fact and effectively controls this flow of air over the ailerflap in accomplishing lateral control of the airplane.

In addition to the flow control function, the slot lip also serves to increase and decrease the size of the slot in direct proportion to the desired lateral control result. Opening and closing an aileron slot has a definite effect upon the lift of the wing. For example, when the slot is wide open the wing lift is decreased and when the size of the slot is decreased the lift is increased. With this thought in mind, it may be seen that, under the operating conditions which just have been described, when the pilot's control is operated to raise the ailerflap and slot lip from their respective neutral positions to decrease the lift on the wing the trailing edge of the slot lip will move away from its close relationship with the upper surface of the ailerflap and increase the size of the slot in lift decreasing relation. Conversely, when the two control airfoils are moved downward about their pivots from the neutral position, the trailing edge of the slot lip will reduce the size of the slot to further increase the lift effect obtained by the downward rotation of the control airfoils.

Different aircraft have different control characteristics and it has been found on some craft that more advantageous results will be had if the control airfoil operating mechanism is adjusted to also change the neutral position of the slot lip when the ailerflap is moved from its normal high speed position. To obtain the improvement, the mechanism is arranged to raise the neutral position of the slot lip a small amount, say of the order of three degrees from which position it has its upward and downward throw. This range of travel is indicated by dotted lines 99, 101 from a neutral position 103 in Figure 5.

Figure 6:
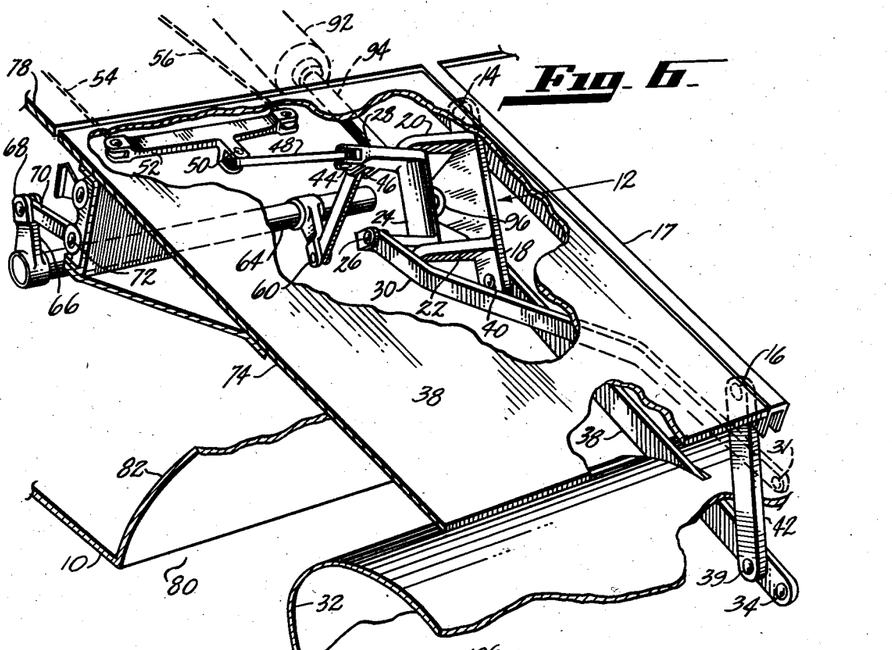
Figure 6 is a fragmentary perspective view of the airplane wing and control airfoils shown in Figure 1, with portions cut away to show the mechanism, and with one of the control airfoils moved to a maximum lift or landing position.

In Figure 6 the mechanism of Figures 2 and 4 is again shown but in still another position wherein the ailerflap has been again moved farther aft and rotated downwardly to what may be considered a full flap position in which the greatest increase of lift on the wing is obtained. To move the mechanism assembly 12 to this new position the piston 94 of hydraulic cylinder 92 is completely extended, thus rotating the carrier member 18 still farther about its pivotal connection to the main airfoil at 14.

As may be readily seen in the drawing, when the ailerflap is full down it is still controlled by the cables 54, 56 for simultaneous movement with the slot lip about their respective neutral positions. It may be mentioned here that self-aligning bearings are used in all pivots where there is any displacement of one member relative to another out of the normal plane of pivot. These bearings ordinarily permit at least a 10° variation on either side of the pivot plane.

Figure 7:
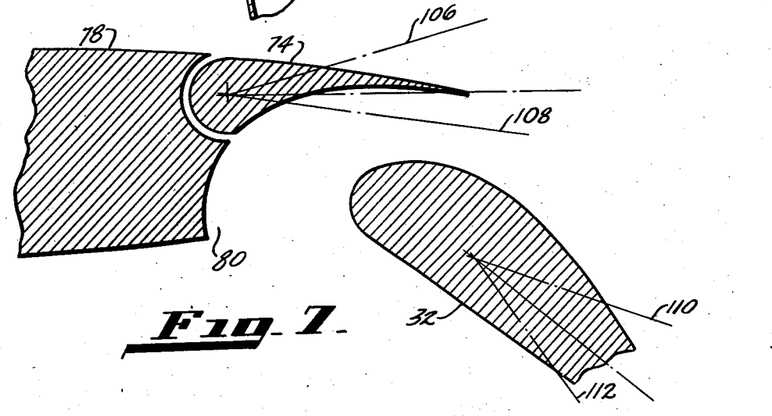
Figure 7 is a diagrammatic side elevational view of the trailing portion of the airplane wing of Figure 5, with the control airfoils moved to a maximum lift or landing position as indicated in Figure 6, and including broken lines indicating the approximate extent of rotation of the control airfoils from their respective new neutral position.

Relative movements of the slot lip and ailerflap as effected through the mechanism assembly while in the latter position are shown in Figure 7, and broken lines 106, 108 and 110, 112 indicate the upward and downward ranges of movement of the two members from their respective neutrals. It may be seen that in this maximum lift position of the ailerflap as in all of its positions, the slot lip continues to function in controlling the flow of air over the ailerflap in accordance with the desired lateral control effect.

Figure 8:
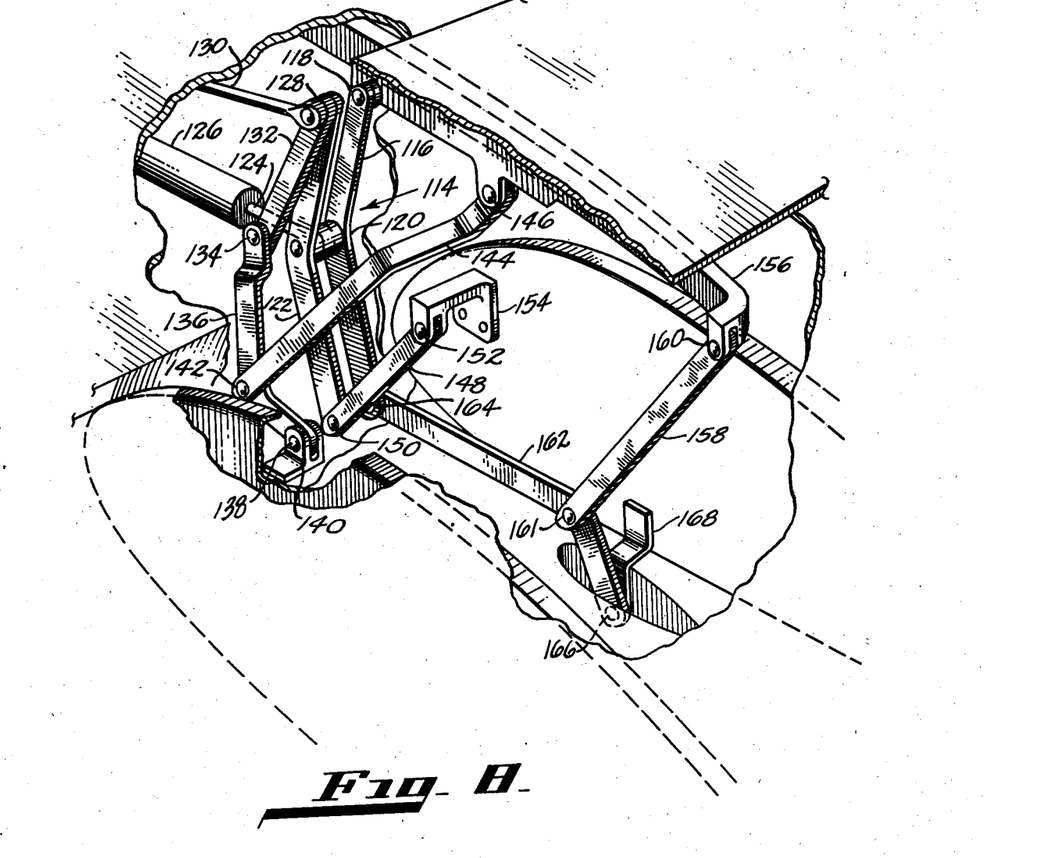
Figure 8 is a fragmentary perspective view of the airplane wing and control airfoils mounted thereon, with portions thereof cut away to show another embodiment of a control mechanism.
Figure 9:
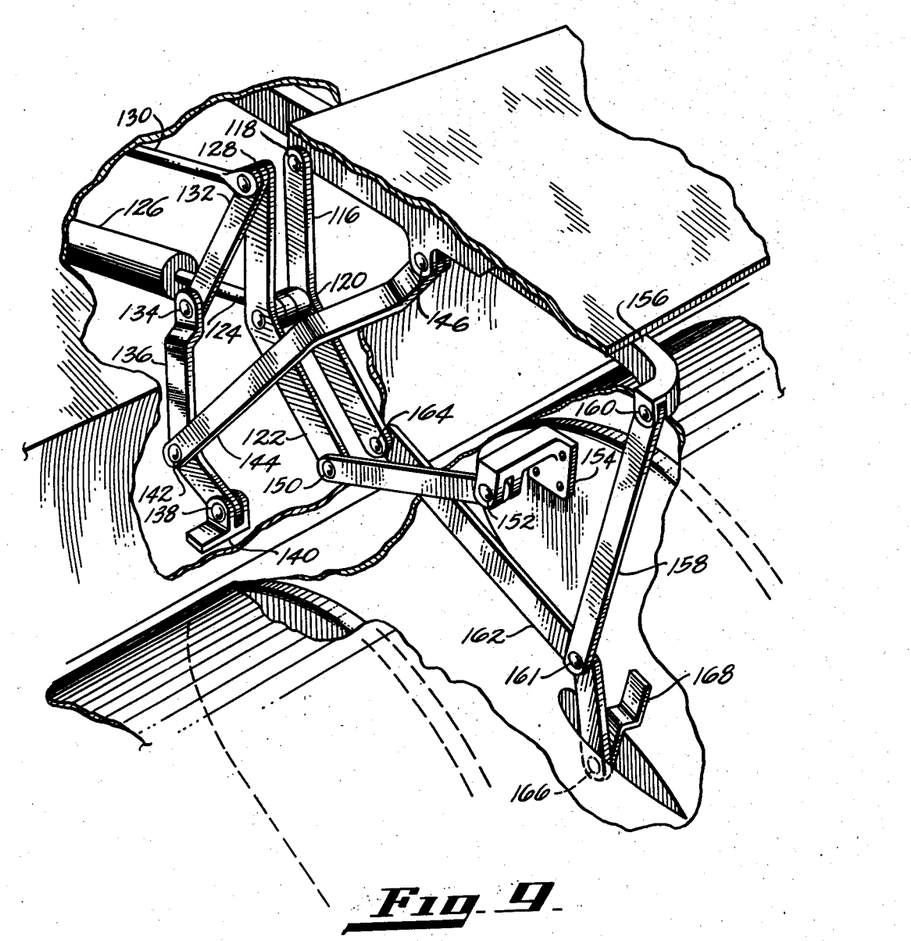
Figure 9 is a fragmentary perspective view of the airplane wing and control airfoils of Figure 8, showing the mechanism displaced whereby one of the airfoils is moved to a lift increasing, takeoff or approach position.
Figure 10:
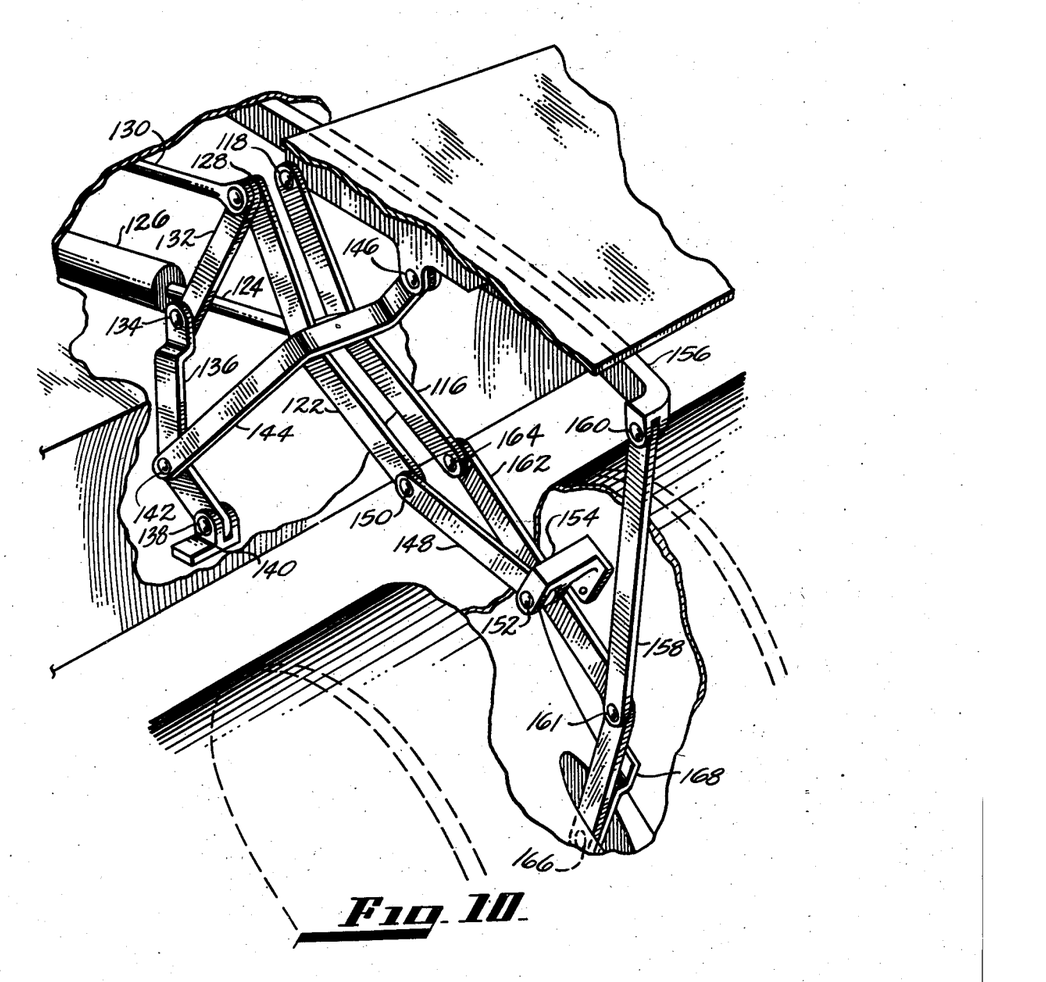
Figure 10 is a fragmentary perspective view of the airplane wing and control airfoils of Figure 9, showing the mechanism still further displaced whereby one of the airfoils is moved to a maximum lift or landing position.

In Figures 8, 9, and 10 we have shown another embodiment of a mechanism for accomplishing the movements of the ailerflap and the slot lip as previously described.

Figure 8 shows this mechanism as it appears when the ailerflap is in its full up or normal position wherein it functions exclusively as an aileron.

Figure 9 shows the mechanism as it appears when the ailerflap has been moved to a takeoff or approach position to slightly increase the lift of the main supporting airfoil and at the same time perform aileron functions.

Figure 10 shows the mechanism as it appears when the ailerflap is in the full down or maximum lift increasing position, wherein it still functions as an aileron but to a lesser extent.

With particular reference now to Figure 8 it may be seen that the basic operating principle of this arrangement is quite similar to that shown in Figures 2, 4, and 6. The mechanism assembly 114 includes a carrier member 116 pivoted to the main airfoil structure at 118 which pivot, incidentally, is coaxial with the slot lip pivot. The member is in the form of a crank having a central pivot 120 and this same pivot serves as a central turning point for a similar crank 122. Also attached at this pivot is a piston 124 of a hydraulic cylinder 126 identical to the cylinder 92 described in the previous embodiment. This cylinder is likewise pivoted at its closed end to the main airfoil structure.

At the upper end of crank 122 a pivotal connection 128 is provided for a control link 130 corresponding in function to the link 48 in Figure 1. In other words, this link extends to a bell crank to which control cables are attached for movement of the ailerflap and slot lip in either direction from their respective neutral positions. From the pivot 128 a short link 132 extends downwardly and is pivotally connected at 134 to a link 136. The latter link is pivoted at 138 to a bracket 140 fixed to the main airfoil structure. Substantially intermediate the ends of link 136, at the bend therein, there is a pivotal connection 142 for a link 144 extending upwardly and connecting at 146 to the slot lip. It is this latter link which transmits the movement of the control link 130 to the slot lip. Movement of the ailerflap is effected by a link 148, pivotally connecting at 150 to the lower end of crank 122 and at 152 to a bracket 154 fixed on the upper leading edge portion of the ailerflap. The ailerflap is supported from the main airfoil structure by a beam 156 similar to the beam 17 in Figure 2 to which is pivoted a link 158 at 160. The link 158 extends downwardly and connects at 161 with an arm 162 which is in turn pivoted at 164 to the lower end of the carrier member 116 and at 166 to a bracket 168 fixed to the lower surface of the ailerflap.

Considering the operation of the slot lip and ailerflap to move them from their neutral positions, as shown in Figure 8, it may be seen that fore and aft movement of the control link 130 will cause rotation of the crank 122 about its pivot 120. This will transmit movement to the link 148 and cause the ailerflap to pivot about point 166. At the same time the slot lip will be caused to move in accordance with the ailerflap by reason of its connection with control link 130 through links 132, 136, and 144. With the mechanism in this position the relative movements of the two control airfoils as effected by movement of the control link 130 will be substantially as shown in Figure 2.

Figure 5:
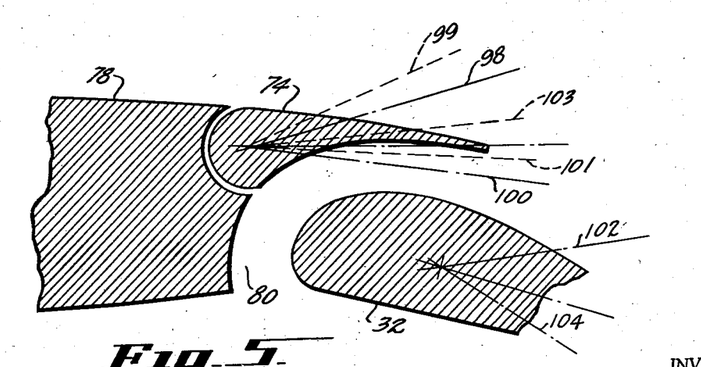
Figure 5 is a diagrammatic side elevational view of the trailing portion of the airplane wing of Figure 3, with the control airfoils moved to a moderately low speed, takeoff or approach position as indicated in Figure 4, and including broken lines indicating the approximate extent of differential rotation of the control airfoils from their respective new neutral position.

In Figure 9 the piston 124 of hydraulic cylinder 126 has been partially extended to move the pivot 120 and likewise the two crank links 116 and 122 to the rear about their upper pivots. This act, through the linkage 158 and 162, displaces the ailerflap to a rearward, takeoff or approach position. From this new position simultaneous movement of the two control airfoils is still effected by fore and aft motion of the control link 130 but in a changed degree by reason of the change of position of the various links relative to each other. Relative movements of the slot lip and ailerflap are substantially as shown in Figure 5.

In Figure 10 the piston 124 of hydraulic cylinder 126 has been completely extended, moving the ailerflap still farther aft and downward to a maximum lift position. In this new linkage position rotation of the ailerflap and slot lip about their pivots is effected as before by fore and aft movement of the control link 130 in a still different amount, substantially as shown in Figure 7.

With both linkage embodiments it may be seen that while the lift of the main airfoil is varied in accordance with flight conditions through movement of the ailerflap pivot, both the ailerflap and slot lip retain lateral control effectiveness at all times. As the ailerflap moves downward its effect for lateral control gradually decreases but at the same time the movements and effectiveness of the slot lip gradually increase and thus retain ample lateral control with respect to the main airfoil. Satisfactory hinge moments are retained and a substantially constant load feel effect is provided by the combined movements of the ailerflap and slot lip.

While we have herein shown and described our invention in its present and preferred linkage embodiments it will be obvious to those skilled in the art, after understanding the invention, that other mechanisms may be devised to obtain the same relative movements of the two control members both with respect to each other and with respect to the main airfoil. Accordingly, we do not wish to be limited other than by the appended claims.

We claim:

1. In a lateral control device for aircraft, a main supporting airfoil, a control member spaced from the trailing edge of said main supporting airfoil to form a slot therebetween, said member being disposed spanwise of said main airfoil for pivotal movement about an axis, a second control member normally disposed in slot closing relation with said main supporting airfoil and said first named control member and adapted to pivot about an axis substantially parallel to the pivotal axis of said first named control member, unitary means operable by the pilot and independently connected to each of said control members for imparting simultaneous movement to said control members about their respective axes, and means associated with said first named means for changing the position of the axis of said first named control member with respect to the main supporting airfoil and with respect to its spacing from the axis of said second control member, said unitary means being adapted to retain control of both of said control members at all the spacing of said control member axes as determined by said first control member axis changing means.

2. In a lateral control device for aircraft, a main supporting airfoil, a control member spaced from the trailing edge of said main supporting airfoil to form a slot therebetween, said member being disposed spanwise of said main airfoil for pivotal movement about an axis, a second control member normally closing the slot between said main supporting airfoil and said first named control member, and adapted to pivot about an axis substantially parallel to the pivotal axis of said first named control member, and unitary means operable by the pilot and independently connected to each of said control members for imparting simultaneous codirectional rotative movement thereto about their respective pivotal axes.

3. In a lateral control device for aircraft, a main supporting airfoil, a control member spaced from the trailing edge of said main supporting airfoil to form a slot therebetween, said member being disposed spanwise of said main airfoil for pivotal movement about an axis, a second control member normally disposed in slot closing relation with said main supporting airfoil and said first named control member and adapted to pivot about an axis substantially parallel to the pivotal axis of said first named control member, unitary means operable by the pilot and independently connected to each of said control members for imparting to said control members simultaneous upward and simultaneous downward rotative movements about their respective pivotal axes from a neutral position, and means associated with said first named means for changing the position of the axis of said first named control member with respect to the main supporting airfoil and with respect to its spacing from the axis of said second control member, said unitary means being adapted to retain control of both said control members at all the spacings of said control member axes as determined by said first control member axis changing means.

4. In a lateral control device for aircraft, a main supporting airfoil, a control member spaced from the trailing edge of said main supporting airfoil to form a slot therebetween, said member being disposed spanwise of said main airfoil for pivotal movement about an axis, a second control member normally closing the slot between said main supporting airfoil and said first named control member and adapted to pivot about an axis substantially parallel to the pivotal axis of said first named control member, and unitary means operable by the pilot and independently connected to each of said control members for imparting thereto simultaneous upward and simultaneous downward movements about their respective pivotal axes from a neutral position.

5. In a lateral control device for aircraft, a main supporting airfoil, a control member spaced from the trailing edge of said main supporting airfoil to form a slot therebetween, said member being disposed spanwise of said main airfoil for pivotal movement about an axis, a second control member normally disposed in slot closing relation with said main supporting airfoil and said first named control member and adapted to pivot about an axis substantially parallel to the pivotal axis of said first named control member, unitary means operable by the pilot and independently connected to each of said control members for imparting to said control members simultaneous upward and simultaneous downward movements about their respective pivotal axes from a neutral position, means for moving the pivotal axis of said first control member from a high speed position to one or various median positions and from such median positions to a landing position, said last mentioned means serving to change the rotative movements of said control members about their pivotal axes with respect to each other as effected by said unitary control means.

6. In a lateral control device for aircraft, a main supporting airfoil, a control member spaced from the trailing edge of said main supporting airfoil to form a slot therebetween, said member being disposed spanwise of said main airfoil for pivotal movement about an axis, a second control member normally disposed in slot closing relation with said main supporting airfoil and said first named control member and adapted to pivot about an axis substantially parallel to the pivotal axis of said first named control member, means to displace the pivotal axis of said first named control member rearwardly and downwardly to form a slot between said first and second named control members, and a unitary means to simultaneously rotate both said control members about their pivotal axes in either direction of rotation, to increase or decrease the lift of said main supporting airfoil respectively, said means being so organized and arranged as to correspondingly decrease and increase respectively the size of the slot between said control members.

7. In a lateral control device for aircraft, a main supporting airfoil, a control member spaced from the trailing edge of said main supporting airfoil to form a slot therebetween, said member being disposed spanwise of said main airfoil for pivotal movement about an axis, a second control member normally disposed in slot closing relation with said main supporting airfoil and said first named control member and adapted to pivot about an axis substantially parallel to the pivotal axis of said first named control member, unitary means operable by the pilot and connected to said control members for simultaneously and codirectionally rotating them in either direction about their respective pivots to increase or decrease respectively the lift of said main supporting airfoil, said means being organized and arranged to move said second control member away from said first control member in slot increasing relation when said members swing upward on their pivotal axes and to move said second control member toward said first control member in slot decreasing relation when said members swing downward on their pivotal axes.

8. In a lateral control device for aircraft, a main supporting airfoil, a first control member spaced from the trailing edge of said main supporting airfoil to form a slot therebetween, said member being disposed spanwise of said main airfoil for pivotal movement about an axis, a second control member normally disposed in slot closing relation with said main supporting airfoil and said first named control member and adapted to pivot about an axis substantially parallel to the pivotal axis of said first control member, a primary member pivoted about an axis, means operatively connecting both said first and second control members to said primary pivotal member each of said connections being independent of the other, first pilot operated means for rotating said primary pivotal member about its axis to impart simultaneous movement to said first and second control members about their respective pivotal axes, and second pilot operated means for simultaneously changing the positions of said primary pivotal member's axis and said first control member's axis with respect to said main supporting airfoil and with respect to said second control member's pivotal axis, said first pilot operated means being adapted to retain control of both said first and second control members at all the relative positions of said control member axes.

9. In a lateral control device for aircraft, a main supporting airfoil, a first control member spaced from the trailing edge of said main supporting airfoil to form a slot therebetween, said member being disposed spanwise of said main airfoil for pivotal movement about an axis, a second control member normally disposed in slot closing relation with said main supporting airfoil and said first control member, and adapted to pivot about an axis substantially parallel to the pivotal axis of said first control member, a primary member pivoted about an axis, means operatively connecting said primary pivotal member to each of said first and second control members for imparting simultaneous rotative movement thereto in at least two directions from a neutral position each of said connections being independent of the other, first pilot operated means for rotating said primary pivotal member about its pivotal axis, and second pilot operated means for changing the relative neutral positions of said control surfaces and varying the relative movements thereof from said neutral positions as effected by said first pilot operated means.

10. In a lateral control device for aircraft, a first airfoil, a second airfoil pivoted to said first airfoil and spaced therefrom so as to form a slot, a third airfoil pivoted to said first airfoil above and forward of said second airfoil in slot closing relation, a linkage mechanism carried by said first airfoil and connected to said second and third airfoils for imparting simultaneous rotation thereto about their respective pivots in at least two directions from a neutral position each of said connections being independent of the other, first pilot operated means connected to said linkage mechanism for imparting movement thereto, and second pilot operated means for displacing said second airfoil from its first neutral position to different neutral positions said linkage mechanism being constructed and connected to said second airfoil to impart said rotation to said second airfoil in at least two directions from each of said different neutral positions.

11. In a lateral control device for aircraft, a first airfoil, a second airfoil pivoted to said first airfoil and spaced therefrom so as to form a slot, a third airfoil pivoted to said first airfoil and adapted to overlie said slot, a linkage mechanism carried by said first airfoil and connected to said second and third airfoils for imparting simultaneous rotation thereto about their respective pivots differentially from a neutral position, said mechanism including a carrier member pivoted to said airfoil, crank means mounted on said carrier member for movement both with and with respect thereto, a first link means connecting said crank means to said second airfoil, a second link means connecting said crank means to said third airfoil independently of the connection of said first link means to said second airfoil, first pilot operated means pivoted to said carrier member for rotating said member on its pivot to change the position of said second airfoil pivot relative to said first airfoil, and second pilot operated means pivoted to said crank means for moving said crank means relative to said carrier member to rotate both said second and third airfoils about their respective pivots and vary the size of the slot between said first and second airfoils.

12. In a lateral control device for aircraft, the combination of: a main supporting airfoil; a control flap aft the trailing edge of said main supporting airfoil, said flap being supported for pivotal movement about an axis spanwise of the airfoil; a control slot lip overlying the slot between the airfoil and flap, the slot lip being supported for pivotal movement about an axis parallel to said axis and in slot-closing relation with the airfoil; a first means for moving the pivotal support of the flap over an upper fore and lower aft range between a forward slot-closing position and an aft-displaced maximum slot-opening position with relation to the airfoil and for varying the inclination of the flap to the horizontal, the outwardly exposed surfaces of the slot lip and flap fairing with the surfaces of the airfoil in said forward slot-closing position and the flap being inclined increasingly downwardly in substantially direct correlation with the extent of said aft displacement from the airfoil; and a second means for co-ordinately and co-directionally moving the flap and slot lip about their axes over a limited angular travel range above and below a neutral position for aileron roll control, said second means being operative at any position of the flap over said fore and aft range to effect a substantial and effective aileron movement of the slot lip, and being operative at any position of the flap over at least the more forward portion of said range to effect a substantial and effective aileron movement of the flap.

13. The combination defined in claim 12 in which said slot between the slot lip and flap is substantially closed at all aileron positions of the slot lip and flap with the flap in said slot closing position and in which said slot between the slot lip and flap progressively increases in width for corresponding aileron positions as the flap is moved rearwardly and downwardly by said first means.

14. The combination defined in claim 12 in which said slot between the slot lip and flap is substantially closed at all aileron positions of the slot lip and flap with the flap in said slot closing position and in which said slot between the slot lip and flap progressively increases in width for corresponding aileron positions as the flap is moved rearwardly and downwardly by said first means at least during a substantial first portion of said rearward and downward movement.

15. The combination defined in claim 12 in which said slot between the slot lip and flap is substantially closed at all aileron positions of the slot lip and flap with the flap in said slot closing position and said slot between the slot lip and flap progressively increases in width to a maximum for corresponding aileron positions as the flap is moved rearwardly and downwardly by said first means, and said slot between the slot lip and flap for any given fore and aft flap position increases in width from a minimum at the extreme down aileron position to a maximum at the extreme up aileron position.

16. The combination defined in claim 12 in which the slot between said slot lip and flap is substantially closed at all aileron positions of said slot lip and flap with said flap in said slot closing position and the slot between said slot lip and flap progressively increases in width to a maximum for corresponding aileron positions as the flap is moved rearwardly and downwardly by said first means and the slot lip is disposed with its under surface directed to prevent air separation from the upper surface of said flap in the downward portion only of the range of the aileron movement given said flap and slot lip by said second means.

17. The combination defined in claim 12 in which the slot between said slot lip and flap is substantially closed at all aileron positions of said slot lip and flap with said flap in said slot closing position and the slot between said slot lip and flap progressively increases to a maximum for corresponding aileron positions as the flap is moved rearwardly and downwardly by said first means, the slot between said slot lip and flap for any given fore and aft flap position increases in width from a minimum at the extreme down aileron position to a maximum at the extreme up aileron position and the slot lip is disposed with its under surface directed to prevent air separation from the upper surface of said flap in the downward portion only of the range of the aileron movement given said flap and slot lip by said second means.

18. The combination defined in claim 12 in which as said flap is moved rearwardly over said fore and aft range by said first means the angular range of aileron movement of said flap by said second means has no substantial increase and the angular range of aileron movement of said slot lip by said second means substantially increases.

19. The combination defined in claim 12 in which the neutral and extreme positions of the slot lip for roll control for the more rearward portion of the fore and aft range of movement of the flap are respectively higher than the corresponding roll control positions of the slot lip in the more forward portion of said fore and aft range.

20. In a lateral control device for aircraft, a first airfoil, a second airfoil pivoted to said first airfoil and rearwardly displaceable therefrom so as to form a slot of varying dimensions, and means movable, in all positions of rearward displacement of said second airfoil, to increase the size of said slot with lift decreasing pivotal movement of said second airfoil relative to said first airfoil and to decrease the size of said slot with lift increasing pivotal movement of said second airfoil relative to said first airfoil.

21. In a lateral control device for aircraft, a first airfoil, a second airfoil pivoted to said first airfoil and spaced therefrom so as to form a slot therebetween, a third airfoil pivoted to said first airfoil above and forward of said second airfoil pivot in slot closing relation, both said second and third airfoils cooperating when in their normal positions to form a substantial continuation of said first airfoil, first pilot operated means for moving said second airfoil aft and downward from said normal position with respect to said first airfoil to one or several second positions wherein said slot is increased in size, and from said second positions to a third position wherein said slot is further changed in size, and second pilot operated means for simultaneously rotating both said second and third airfoils about their respective pivotal connections to said first airfoil in varying relative amounts depending upon their relative positions as determined by said first pilot operated means, said third airfoil being rotatable in said third position to at least the degree of rotation possible when in said second positions.

22. In a lateral control device for aircraft, a first airfoil, a second airfoil carried by said first airfoil for pivotal movement and spaced therefrom so as to form a slot therebetween, a third airfoil pivoted to said first airfoil above and forward of said second airfoil pivot in slot closing relation, both said second and third airfoils cooperating when in their normal positions to form a substantial continuation of said first airfoil, first pilot operated means for moving said second airfoil aft and downward from said normal position with respect to said first airfoil to one or several second positions wherein said slot is increased in size, and from said second positions to a third position wherein said slot is further changed in size, second pilot operated means for simultaneously rotating both said second and third airfoils about their respective pivotal connections to said first airfoil, and means interconnecting said first and second pilot operated means for varying the relative rotative movements of said second and third airfoils in accordance with their varying relative positions, said third airfoil being rotatable in said third position to at least the degree of rotation possible when in said second positions.

FRANCIS H. CLAUSER.
CARLOS C. WOOD.